(12) United States Patent
Speller, Jr. et al.

(10) Patent No.: US 10,385,959 B2
(45) Date of Patent: Aug. 20, 2019

(54) FLANGE-MOUNTED RING GEAR FOR IMPROVED HEAT MANAGEMENT

(71) Applicant: Bell Helicopter Textron Inc., Forth Worth, TX (US)

(72) Inventors: Charles Hubert Speller, Jr., Flower Mound, TX (US); Scott David Poster, Arlington, TX (US); Walter Riley, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 114 days.

(21) Appl. No.: 15/702,882

(22) Filed: Sep. 13, 2017

(65) Prior Publication Data

US 2018/0017153 A1 Jan. 18, 2018

Related U.S. Application Data (63) Continuation-in-part of application No. 15/434,609, filed on Feb. 16, 2017, now Pat. No. 10,221,939.

(Continued)

(51) Int. Cl.

| F16H 57/04 | (2010.01) |
|---|---|
| F16H 57/027 | (2012.01) |
| F16H 1/28 | (2006.01) |
| B64C 27/14 | (2006.01) |
| F16H 57/08 | (2006.01) |

(Continued)

(52) U.S. Cl.
CPC ......... *F16H 57/0416* (2013.01); *B64C 27/14* (2013.01); *B64D 35/00* (2013.01); *F16H 1/28* (2013.01); *F16H 57/027* (2013.01); *F16H 57/0482* (2013.01); *F16H 57/08* (2013.01); *F16H 57/082* (2013.01); *F16H 2057/02043* (2013.01)

(58) Field of Classification Search
None
See application file for complete search history.

(56) References Cited

U.S. PATENT DOCUMENTS 2,520,887 A * 8/1950 Miller, Jr. ............... B64C 27/12
   416/170 R
2,911,851 A * 11/1959 Wachs .................... B64C 27/12
   244/60

(Continued)

FOREIGN PATENT DOCUMENTS

DE 102016202753 A1 * 8/2017 ............... F16D 1/06
EP 2505878 A1 10/2012

(Continued)

OTHER PUBLICATIONS

Bell Helicopter Textron Inc., "Bell 525 Relentless" Poster, Nov. 12, 2014.

(Continued)

*Primary Examiner* — Dirk Wright
(74) *Attorney, Agent, or Firm* — Daniel J. Chalker; Edwin S. Flores; Chalker Flores, LLP (57) ABSTRACT

A ring gear includes a ring having one or more sets of inwardly facing teeth, a circumferential flange extending outward from the ring, and the flange is mounted between a first housing and a second housing. In addition, the flange protrudes into an ambient air outside the first housing and second housing.

26 Claims, 6 Drawing Sheets

Related U.S. Application Data (60) Provisional application No. 62/399,097, filed on Sep. 23, 2016, provisional application No. 62/423,371, filed on Nov. 17, 2016, provisional application No. 62/295,922, filed on Feb. 16, 2016.

(51) Int. Cl.
  *B64D 35/00* (2006.01)
  *F16H 57/02* (2012.01)

(56) References Cited

U.S. PATENT DOCUMENTS

| | | | | |
|---|---|---|---|---|
| 3,255,825 | A * | 6/1966 | Mouille | B64C 27/12 244/60 |
| 3,486,832 | A * | 12/1969 | Carnell | B64C 27/14 416/114 |
| 4,856,377 | A * | 8/1989 | Goudreau | F02C 7/36 475/337 |
| 4,983,153 | A * | 1/1991 | Luijten | B64C 27/12 416/170 R |
| 5,135,442 | A * | 8/1992 | Bossler, Jr. | B64C 27/12 475/1 |
| 5,149,311 | A * | 9/1992 | Luijten | B64C 27/12 244/60 |
| 5,421,656 | A * | 6/1995 | Chory | B64C 27/12 384/551 |
| 5,472,386 | A * | 12/1995 | Kish | B64C 27/14 244/60 |
| 5,797,185 | A * | 8/1998 | Sammataro | B64C 27/12 244/60 |
| 5,802,918 | A * | 9/1998 | Chen | B64C 27/12 74/409 |
| 5,807,202 | A * | 9/1998 | Sammataro | B64C 27/14 244/60 |
| 6,302,356 | B1 * | 10/2001 | Hawkins | B64C 27/12 244/17.11 |
| 6,443,035 | B1 * | 9/2002 | Scardullo | B64C 27/12 74/417 |
| 6,902,508 | B2 * | 6/2005 | Stille | B64C 27/12 464/182 |
| 8,585,536 | B2 * | 11/2013 | Norem | F16H 57/082 475/331 |
| 9,097,317 | B2 * | 8/2015 | Ai | F16H 1/28 |
| 9,388,880 | B2 * | 7/2016 | Shizu | F16H 1/28 |
| 9,458,923 | B2 * | 10/2016 | Poster | F16H 57/027 |
| 9,702,451 | B2 * | 7/2017 | Gravina | F03D 15/10 |
| 10,221,939 | B2 * | 3/2019 | Poster | F16H 57/082 |
| 2013/0192264 | A1 | 8/2013 | McCune et al. | |
| 2017/0234421 | A1 | 8/2017 | Poster | |

FOREIGN PATENT DOCUMENTS

| | | | | |
|---|---|---|---|---|
| EP | | 2738426 A1 * | 6/2014 | ......... F16H 57/0442 |
| EP | | 2738426 A1 | 6/2014 | |
| EP | | 3299676 A1 | 3/2018 | |
| WO | WO-2016139641 A1 * | | 9/2016 | ............. B64C 27/12 |

OTHER PUBLICATIONS

Perry, Dominic, "Analysis: Bell 525 Relentless cutaway and Technical Description" Flight International, Nov. 14, 2014, London, https://www.flightglobal.com/news/articles/analysisbell525relentlesscutawayandtechnical405541/.

European Patent Office, European Search Report for EP Appl. No. 17192701.5 dated Feb. 14, 2018, 4 pp.

European Patent Office, Communication pursuant to Article 94(3) EPC for EP Appl. No. 17192701.5 dated Mar. 6, 2018, 7 pp.

European Patent Office, Communication pursuant to Article 94(3) EPC for EP Appl. No. 17192701.5 dated Jul. 18, 2018, 8 pp.

European Patent Office, Communication pursuant to Article 94(3) EPC for EP Appl. No. 17192701.5 dated Dec. 6, 2018, 5 pp.

* cited by examiner

FLANGE-MOUNTED RING GEAR FOR IMPROVED HEAT MANAGEMENT

CROSS-REFERENCE TO RELATED APPLICATIONS

This patent application: (1) claims priority to and is a non-provisional application of U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System,"; and (2) claims priority to and is a continuation-in-part application of U.S. patent application Ser. No. 15/434,609 filed on Feb. 16, 2017 entitled "System and Apparatus for Supporting a Planetary Carrier within a Gearbox", which is a non-provisional application of U.S. provisional patent application Ser. No. 62/295,922 filed on Feb. 16, 2016. All of the foregoing applications are hereby incorporated by reference in their entirety.

STATEMENT OF FEDERALLY FUNDED RESEARCH

Not applicable.

TECHNICAL FIELD OF THE INVENTION

The present invention relates in general to the field of gears, and more particularly, to a ring gear for use in an aircraft, for example, a rotorcraft.

BACKGROUND OF THE INVENTION

Without limiting the scope of the invention, its background is described in connection with rotorcraft drive systems.

Since their inception, rotorcraft and rotorcraft drive systems have been improved to reduce the possibility of failure during flight. Toward that end, a number of modifications have been made to drive systems to improve reliability. However, despite advances in materials and design, a number of failures continue to occur that affect rotorcraft performance. One example of a problem with current rotorcraft drive systems is that, in some instances, the failure of single drive system component leads to failure of the entire drive system. Another example is a loss of lubrication event that causes the loss of torque transmission by drive system subcomponents such as gearboxes or accessories connected to the main rotor gearbox.

More particularly, the failure of a single gearbox or shaft connected to the main rotor gearbox can significantly impact operations. For example, if there is a loss of lubrication to a gearbox, the gearbox loses torque transmission, causing damage to upstream or downstream components. The same can occur when a shaft becomes unbalanced (or breaks), which can damage couplings, gearboxes and even the main rotor gearbox. Unfortunately, when a portion of a drive system experiences a failure or reduction in performance, the concomitant reduction in power leads to challenges with flight performance.

Thus, a need remains for improving the overall safety and reliability of rotorcraft drive systems that include the connections between the engines and the main rotor gearbox, reduction and accessory gearboxes, shafts, generators, oil pumps, and accessories connected to the main rotor gearbox. Specifically, systems and methods that minimize the number of single load path components, provide maximum system separation and redundancy, minimize maintenance required and maintenance related incidents, minimize the potential of loss of lubrication events, and maximize main rotor gearbox loss of lubrication capability are desirable, including systems and methods for cooling components and systems during normal operations and during loss of lubrication events.

SUMMARY OF THE INVENTION

In one embodiment, the present invention includes a ring gear comprising: a ring having one or more sets of inwardly facing teeth; a circumferential flange extending outward from the ring; and wherein the flange is mounted between with a first housing and a second housing, and the flange protrudes into an ambient air outside the first housing and second housing. In one aspect, the flange is disposed proximate to an upper portion, middle portion or lower portion of the ring. In another aspect, the inwardly facing teeth are straight, helical or curved. In another aspect, the ring gear is cooled by conduction of heat away from the ring gear through the first housing or the second housing or a combination thereof. In another aspect, the ring gear is cooled by convection of heat away from the ring gear to the ambient air outside the ring gear. In another aspect, the ring gear includes at least one mounting hole disposed in and through the flange.

In another embodiment, the present invention includes a gearbox, comprising: a first housing; a second housing; and a ring gear comprising a ring having one or more sets of inwardly facing teeth, a circumferential flange extending outward from the ring, wherein the flange is mounted between the first housing and the second housing, and the flange protrudes into an ambient air outside the first housing and second housing. In one aspect, the flange is disposed proximate to an upper portion, middle portion or lower portion of the ring. In another aspect, the inwardly facing teeth are straight, helical or curved. In another aspect, the ring gear is cooled by conduction of heat away from the ring gear through the first housing or the second housing or a combination thereof. In another aspect, the ring gear is cooled by convection of heat away from the ring gear to the ambient air outside the ring gear. In another aspect, the gearbox is a main rotor gearbox. In another aspect, the gearbox further comprises a planetary carrier supporting a plurality of planet pinion gears that rotate within and engage the one or more sets of inwardly facing teeth of the ring gear; a planetary sun gear disposed between and engaging the plurality of planet pinion gears; and a first bull gear connected to the planetary sun gear. In another aspect, the gearbox further comprises one or more pinion gears that engage the first bull gear; and a second bull gear connected to each pinion gear. In another aspect, the ring gear includes at least one mounting hole disposed in and through the flange.

In another embodiment, the present invention includes a method of cooling a ring gear, comprising: providing gearbox having a first housing, a second housing, and a ring gear comprising a ring having one or more sets of inwardly facing teeth, a circumferential flange extending outward from the ring, wherein the flange is mounted between the first housing and the second housing, and the flange protrudes into an ambient air outside the first housing and second housing; and transferring a heat from the ring gear to the first housing, the second housing, the ambient air, or a combination thereof. In one aspect, the flange is disposed proximate to an upper portion, middle portion or lower portion of the ring. In another aspect, the inwardly facing teeth are straight, helical or curved. In another aspect, the gearbox is a main rotor gearbox. In another aspect, the ring gear includes at least one mounting hole disposed in and through the flange.

In another embodiment, the present invention includes a rotorcraft, comprising: a fuselage; one or more engines disposed within the fuselage; a main rotor gearbox disposed within the fuselage comprising: a first housing, a second housing, and a ring gear comprising a ring having one or more sets of inwardly facing teeth, a circumferential flange extending outward from the ring, wherein the flange is mounted between the first housing and the second housing, and the flange protrudes into an ambient air outside the first housing and second housing, a planetary carrier supporting a plurality of planet pinion gears that rotate within and engage the one or more sets of inwardly facing teeth of the ring gear, a planetary sun gear disposed between and engaging the plurality of planet pinion gears, a first bull gear connected to the planetary sun gear, one or more pinion gears that engage the first bull gear, and a second bull gear connected to each pinion gear and coupled to each engine; and a mast engaging the planetary carrier. In one aspect, the flange is disposed proximate to an upper portion, middle portion or lower portion of the ring. In another aspect, the inwardly facing teeth are straight, helical or curved. In another aspect, the ring gear is cooled by conduction of heat away from the ring gear through the first housing or the second housing or a combination thereof. In another aspect, the ring gear is cooled by convection of heat away from the ring gear to the ambient air outside the ring gear. In another aspect, the ring gear includes at least one mounting hole disposed in and through the flange.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention addresses the problems with drive systems in use today that are known to lead to rotorcraft failure. More particularly, the drive system of the present invention was designed to overcome drive system failures by including one or more of the following design features: (1) minimize the number of single path drive system components; (2) provide maximum system separation and redundancy; (3) minimize maintenance requirements and maintenance related incidents; (4) minimize the potential of loss of lubrication events; and/or (5) maximize main rotor gearbox loss of lubrication capability. The rotorcraft drive system described herein includes, e.g., dual engine reduction gearboxes completely isolated from the remainder of drive system via freewheeling clutches in the main rotor gearbox, dual accessory gearboxes separate from the main rotor gearbox, and the distribution of the gearbox driven accessories among the separate systems, among other improvements.

The present invention was developed to address the failures common to rotorcraft drive systems and is based on a completely new design and application of new technology to rotorcraft safety. More particularly, the new rotorcraft drive system is focused in an unparalleled manner on safety and redundancy. The goal of safety drove the design and development of the unique layout and configuration of the rotorcraft drive system described herein, which incorporates unique features and system separation that protects primary aircraft systems from the most common drive system failures. The drive system has also been designed to maximize the operational capability in the event of an uncommon failure, such as a loss of lubrication.

Moreover, the present inventors recognized that high-speed gearing and the associated heat generation is always an area of concern for gearbox survivability. The ability to continue torque transmission, particularly in a loss of lubrication scenario, is of great importance. For this reason, the drive system described herein includes two separate reduction gearboxes (RGB's), each one connected to a separate engine and independent from the Main Rotor Gearbox (MRGB). The reduction gearboxes are fully self-contained and separate from each other, each reducing the engine output speed from a high speed at or near turbine engine speed of greater than 10,000 RPM to a speed substantially lower than the high speed, a low speed of less than about 6,000 RPM, prior to transmitting torque to the MRGB. With this drive system arrangement high-speed gearing is contained in separate gearboxes, as such, the survivability of the total drive system is greatly enhanced, particularly in the event of high-speed gear failure or loss of lubricant in an individual RGB.

According to one embodiment, the MRGB has additional unique features including the lowspeed (less than about 6,000 RPM) input. The use of independent RGBs that connect to a single lowspeed overhung planetary gear system in the MRGB reduces rotating part count and heat generation. Low gear count is achieved by the use of compound gears that incorporate compartmentalized lubrication recovery elements and one or more independent and monitored chip detectors. With maintenance in mind, the drive system allows for a short mast top case assembly that allows swapping of the top case and mast without removal of the main rotor gearbox from the aircraft. The MRGB also includes a clutch for each input of the reduction gearboxes that allows each reduction gearbox to be separately and independently disconnected from the MRGB.

High-speed gearing and the associated heat generation is always an area of concern for gearbox survivability. The ability to continue torque transmission, particularly in a loss of lubrication scenario is of great importance. For this reason, the present invention includes a powertrain for a rotorcraft that includes two separate engine reduction gearboxes (RGB), e.g., one RGB for each engine of a two-engine rotorcraft. The reduction gearboxes are fully self-contained and separate from each other, reducing the engine output speed from a high speed at or near turbine engine speed of greater than 10,000 RPM to a speed substantially lower than the high speed, e.g., a low speed of less than about 6,000 RPM prior to transmitting torque to the main rotor gearbox (MRGB). This rotational speed reduction is accomplished with, e.g., a simple 3-gear reduction. The rotational reduction can be accomplished with 2, 3, 4, 5, 6 or more gears; however, a three gear system provided the requisite reduction. Each RGB has its own self-contained lubrication system consisting of pump, filter, oil monitoring sensors, and a unique core in the aircraft cooler assembly.

With this arrangement, where high-speed gearing is contained in separate gearboxes, the survivability of the total drive system is greatly enhanced, particularly in the event of high-speed gear failure or loss of lubricant in an individual RGB. Each reduction gearbox can be disconnected from the MRGB by a clutch.

The Main Rotor Gearbox (MRGB) transmits torque from the Reduction Gearboxes (RGB) to the main rotor mast, the accessory gearboxes, the hydraulic pump and generator that is mounted to the MRGB, and to the tail rotor drive shaft.

The drive system of the present invention can also take advantage of a number of additional features that minimize the possibility of loss of lubricant and to maximize the operational time if a loss of lubricant event does occur. For example, a filler cap having a filler port positioned and oriented to serve as a visual inspection port for one or more gears within the gearbox and/or a detachable baffle that allows lubricant to be added to the gearbox but prevents lubricant from exiting the gearbox if the filler cap is not present enhance the operability and safety of the drive system. For example, the drive system can also include one or more of the following: (1) the use of transfer tubes for cooler and filter mounting to eliminate the loss of lubricant in the event of loss of attachment fastener torque; (2) using an oil cooler mounted directly to the main rotor gearbox eliminating external hoses; (3) the use of all oil filter bowls are screw-on instead of held-on with small fasteners eliminating fastener failure issue from repeated removals; (4) the elimination of a high speed planetary and the heat generation associated with it during a loss of lubrication event; (5) the use of gear tooth geometry specifically designed to minimize sliding reducing heat generation at the teeth and the tendency to score during a loss of lubrication event; (6) the use of coarse pitch power gears with clearance or backlash allowing for the expansion during high heat loss of lubrication events; (7) the use of high hot hardness material utilized for primary torque carrying components maximizing their continued operation in the event of a loss of lubrication event; (8) the use of ring gear and case joint design to efficiently transmit heat away from the planetary gears in the event of a loss of lubrication event; and/or (9) the use of isotropic super finished gear teeth resulting in a greatly improved surface finish and maximizing the ability of these gears to operate in a reduced lubrication environment.

Figure 1:
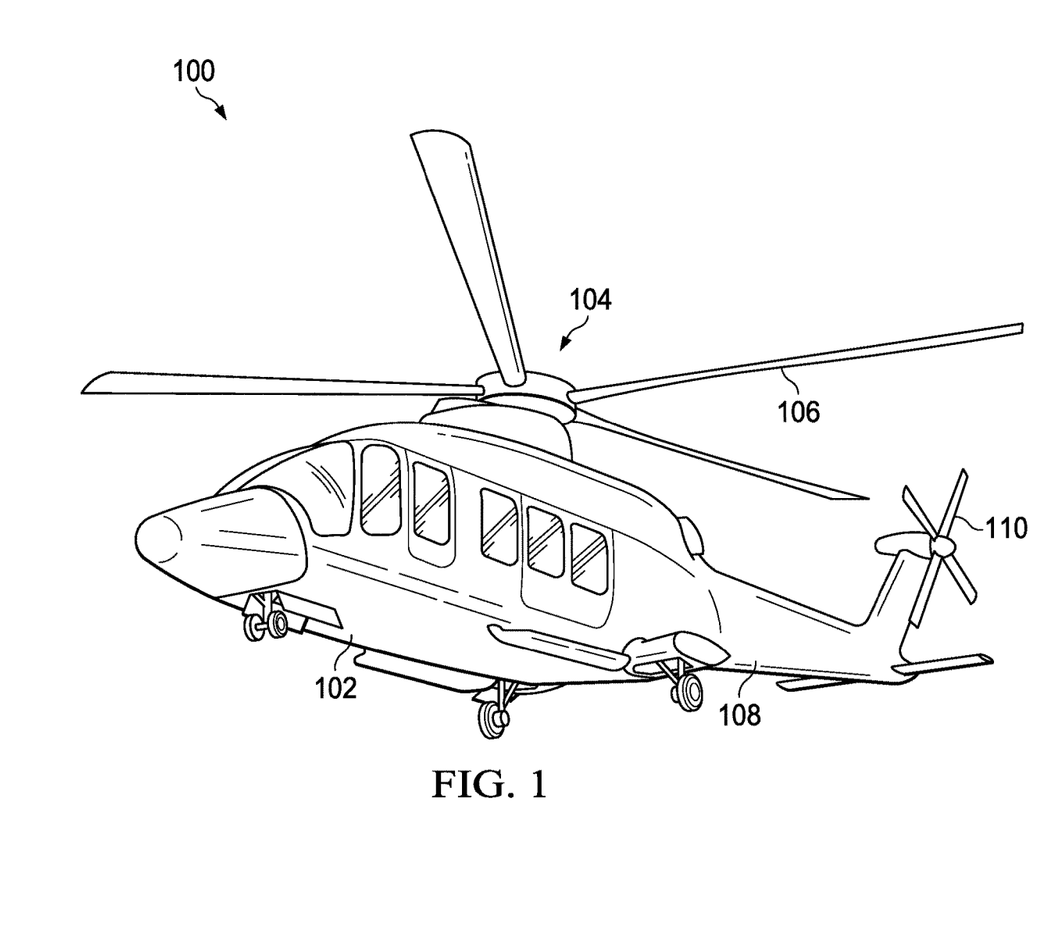
FIG. 1 shows a side view of a helicopter according to an embodiment of the present application.

FIG. 1 shows a helicopter 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
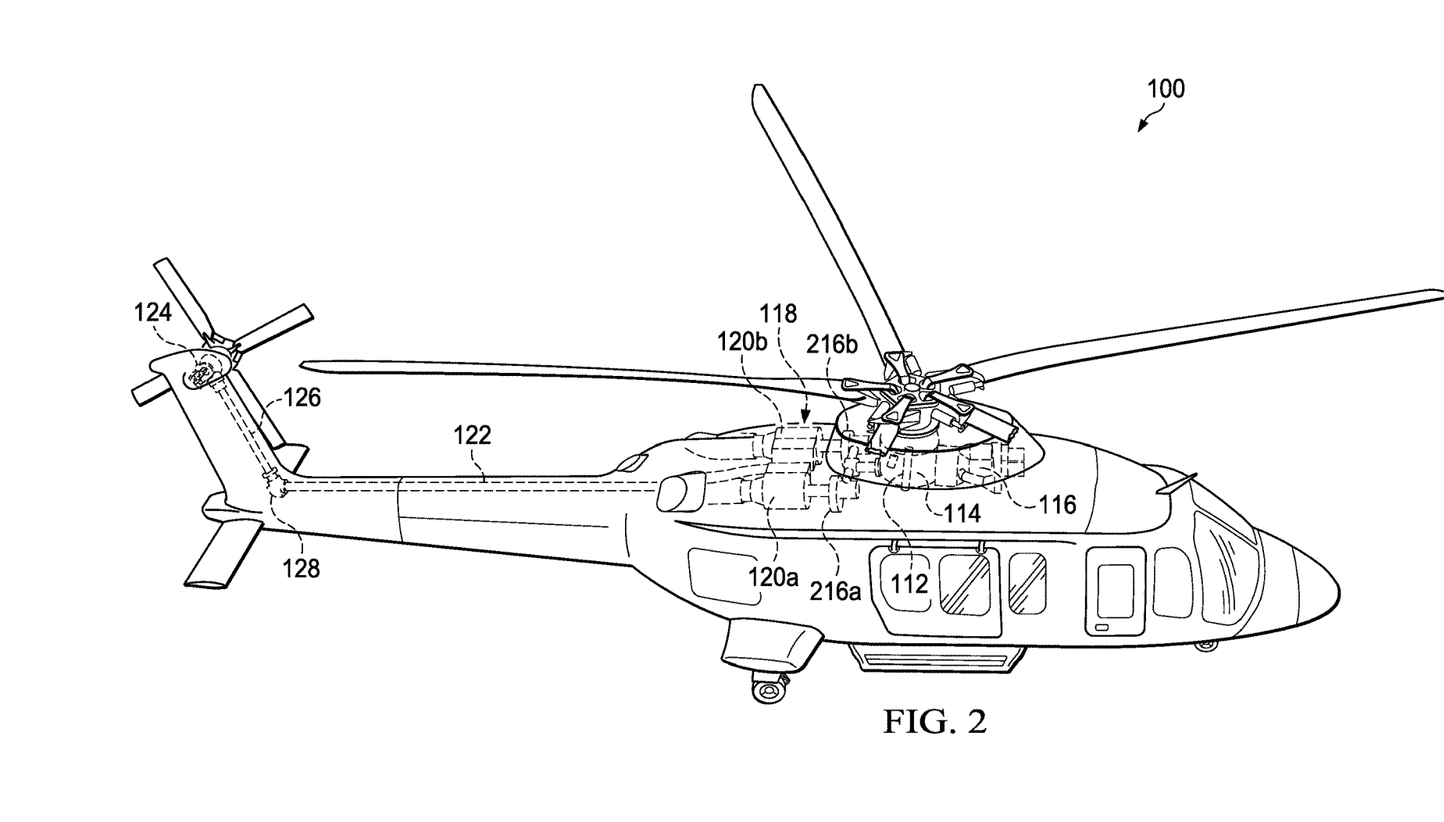
FIG. 2 shows a partial cross-section, perspective view of a helicopter according to an embodiment of the present application.

For example, FIG. 2 shows a partial cross-section perspective view of helicopter 100 that includes additional detail of an embodiment of the present invention. Helicopter 100 further includes a rotor mast 112, which is connected to the main rotor gearbox 114. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation from the main rotor gearbox 114 to the tail rotor gear box 124, which is connected via tail rotor drive shaft 126 and intermediate gear box 128.

Figure 3:
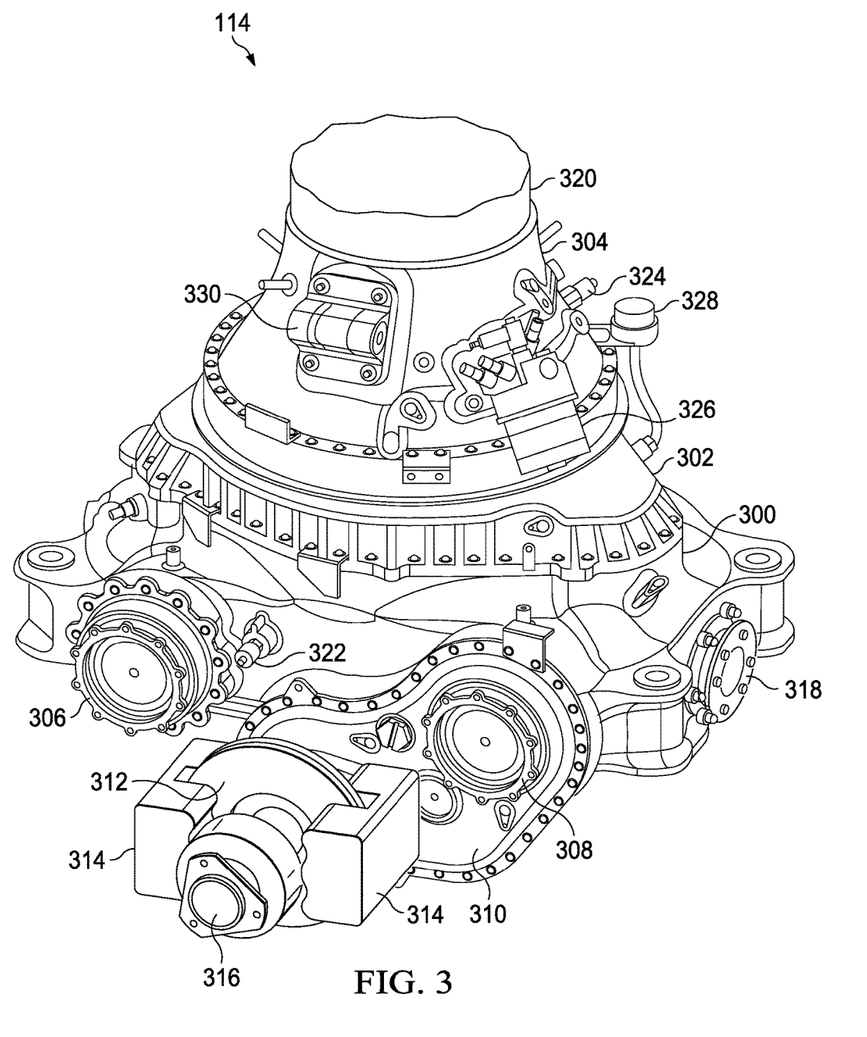
FIG. 3 shows a main rotor gearbox of a helicopter according to an embodiment of the present application.

FIG. 3 shows a main rotor gearbox 114 of a helicopter according to an embodiment of the present application. The main rotor gearbox 114 includes a lower housing 300, a middle housing 302 and an upper housing 304. As will be described in more detail in reference to FIGS. 4-6, the circumferential flange 432 of ring gear 428 is disposed between, and may contact, the middle housing 302 and upper housing 304, and protrudes into the outside surrounding ambient air for additional convective cooling of the ring gear 428. The intimate contact with the cooler cases and surrounding ambient air is particularly good in a loss of lubricant situation.

In this example, the main rotor gearbox 114 includes a first drive input and clutch 308, a second drive input and clutch 306, a tail rotor drive gear assembly 310, a tail rotor disc brake 312 and calipers 314, a tail rotor drive output 316, a generator output 318, hydraulic pump drive output (not shown), first accessory drive output (not shown), second accessory drive output (not shown), oil pump drive output (not shown), and mast housing 320. Other features include tail rotor output section chip detector 322, mast bearing chip detector 324, planetary chip detector (not shown), oil filter 326, oil filler cap 328, non-rotating scissor link mounting bracket 330, and oil cooling system (not shown). The clutches at the first and second drive inputs 306, 308 allow for single engine start and decoupling of either engine/reduction gearbox for single engine operation.

Figure 4:
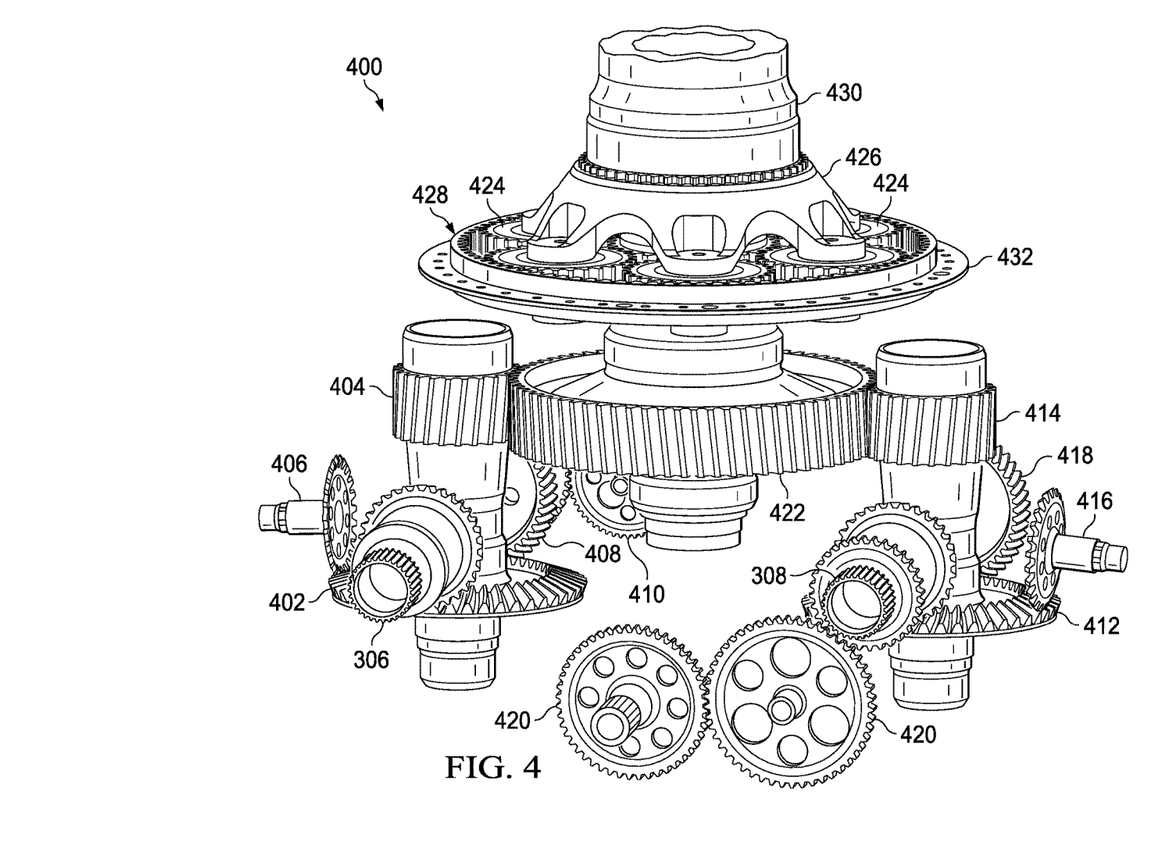
FIG. 4 shows a drive system of a helicopter according to an embodiment of the present application.

FIG. 4 shows a drive system 400 of a helicopter according to an embodiment of the present application. The drive system 400 uses compound gears and low-speed overhung planetary gears to greatly reduce the number of parts within the gearbox and eliminate the heat generation produced by high-speed planetary gears. The first drive input and clutch 306 transmit mechanical rotation to a first spiral bevel bull gear 402, which transmits mechanical rotation to first helical pinion gear 404, a hydraulic pump drive spiral bevel gear 406, and first accessory spiral bevel gear 408. The first accessory spiral bevel gear 408 is a compound gear that also transmits rotation energy to the oil pump drive gear 410. The second drive input and clutch 308 transmits mechanical rotation to a second spiral bevel bull gear 412, which transmits mechanical rotation to second helical pinion gear 414, a generator drive spiral bevel gear 416, and second accessory spiral bevel gear 418. The second drive input 308 is a compound gear that also transmits mechanical rotation to the tail rotor drive gears 420. The first and second helical pinion gears 404, 414 transmit mechanical rotation to a helical bull gear 422, which is a compound gear that transmits mechanical rotation to a planetary sun gear (not shown). The planetary sun gear (not shown) transmits mechanical rotation to a set of planet pinion gears 424 attached to a low-speed planetary carrier 426. The planet pinion gears 424 rotate within and engage ring gear 428. The low-speed planetary carrier 426 supports the planet pinion gears 424 and drives mast 430. The ring gear 428 includes a circumferential flange 432 that is disposed between, and may contact, the middle housing 302 (FIG. 3) and upper housing 304 (FIG. 3), and protrudes into the outside surrounding ambient air for additional convective cooling of the ring gear 428.

Figure 5:
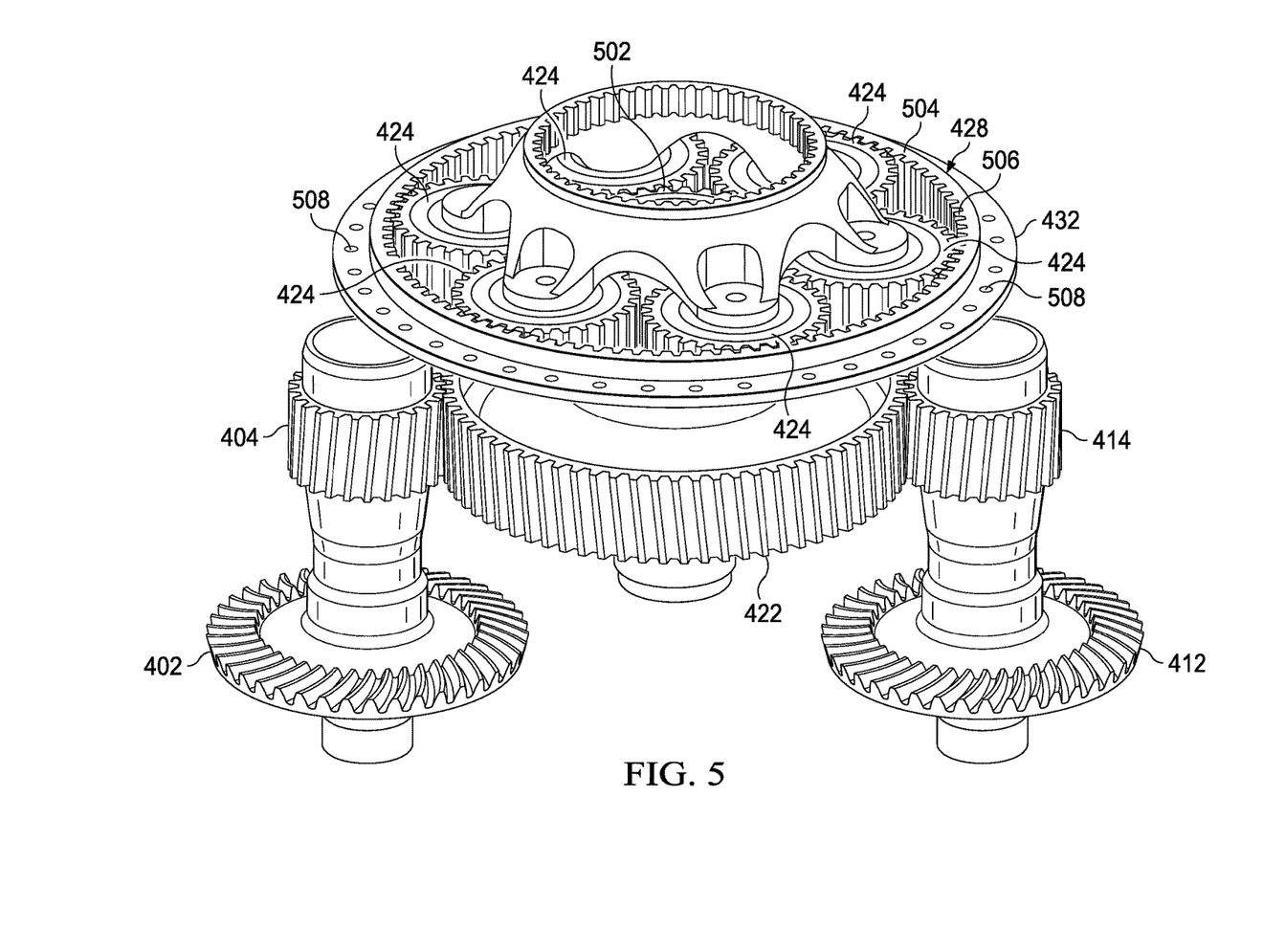
FIG. 5 shows a ring gear and main gearing within a main rotor gearbox according to an embodiment of the present application.

FIG. 5 shows a ring gear 428 and main gearing within a main rotor gearbox 114 (FIG. 3) according to an embodiment of the present application. As previously described in reference to FIG. 4, the first spiral bevel bull gear 402 transmits mechanical rotation to the first helical pinion gear 404, the second spiral bevel bull gear 412 transmits mechanical rotation to the second helical pinion gear 414, and the first and second helical pinion gears 404, 414 transmit mechanical rotation to the helical bull gear 422, which is a compound gear that transmits mechanical rotation to a planetary sun gear 502. The planetary sun gear 502 transmits mechanical rotation to the set of planet pinion gears 424 attached to the low-speed planetary carrier 426. Although six planet pinion gears 424a, 424b, 424c, 424d, 424e, 424f are shown, one skilled in the art will understand that a different number of planet pinion gears can be used. The planet pinion gears 424a, 424b, 424c, 424d, 424e, 424f rotate within and engage ring gear 428. The low-speed planetary carrier 426 supports the planet pinion gears 424a, 424b, 424c, 424d, 424e, 424f and drives mast 430 (FIG. 4).

The ring gear 428 has a ring 504, which includes one or more sets of inwardly facing teeth 506, and a circumferential flange 432. The one or more sets of inwardly facing teeth 506 engage the planet pinion gears 424a, 424b, 424c, 424d, 424e, 424f, and can be straight, helical or curved. A plurality of mounting holes 508 are disposed in and through the flange 432 such that the flange 432 is mounted between, and may contact, a first housing (middle housing 302, FIG. 3) and a second housing (upper housing 304, FIG. 3), and the flange 432 protrudes into an ambient air outside the first housing (middle housing 302, FIG. 3) and second housing (upper housing 304, FIG. 3). As a result, the ring gear 428 is cooled by conduction of heat away from the ring gear 428 through the first housing, or the second housing or a combination thereof. Note that the present invention is not limited to the number of holes shown in the figures or the use of any holes to mount the flange 432. The skilled artisan will recognize that any suitable mounting or connection device(s) can be used to mount the flange 432 between the first housing and second housing. Moreover, direct physical contact is not required between flange 432 and the first and second housings. For example, gaskets or other components/materials can be mounted between and contact the flange 432 and the first housing and/or the flange 432 and the second housing. In addition, the ring gear 428 is cooled by convection of heat away from the ring gear 428 to the ambient air outside the ring gear 428. As shown, the circumferential flange 432 is disposed proximate to a middle portion of the ring 504, but can be disposed proximate to an upper portion or lower portion of the ring 504. The ring gear 428 is cooled by conduction of heat away from the ring gear 428 via the flange 432 and through the first housing or the second housing or a combination thereof.

The skilled artisan will recognize that the specific arrangement of the embodiment in FIGS. 4 and 5 are exemplary and that other embodiments of the present invention that serve the same purposes are possible, given specific requirements and applications. The skilled artisan will also recognize that embodiments of the present invention may be used in conjunction with or may include a variety of gearboxes, including a main rotor gearbox, a tail rotor gearbox, an accessory gearbox, or a reduction gearbox.

Figure 6:
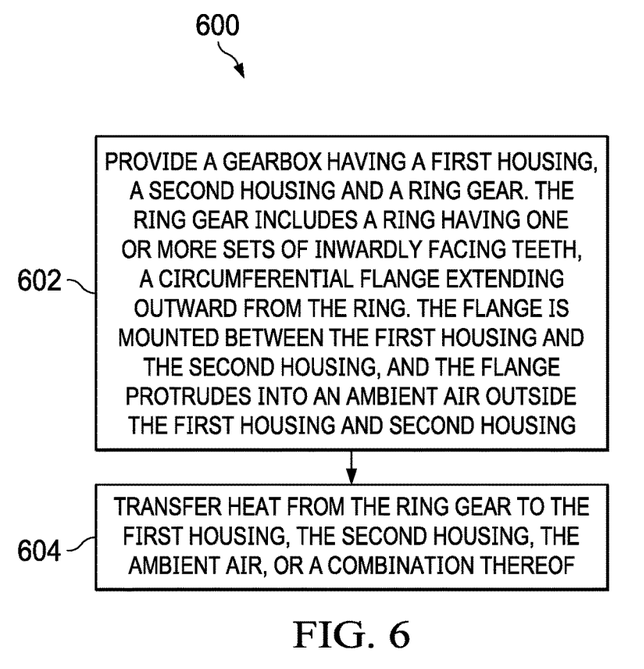
FIG. 6 illustrates a flowchart of a method of using a ring gear according to an embodiment of the present application.

FIG. 6 illustrates a flowchart of a method 600 of cooling a ring gear according to one embodiment of the present application. A gearbox having a first housing, a second housing, and a ring gear is provided in block 602. The ring gear includes a ring having one or more sets of inwardly facing teeth and a circumferential flange extending outward from the ring. The flange is mounted between, and may contact, the first housing and the second housing, and the flange protrudes into an ambient air outside the first housing and second housing. Heat is transferred from the ring gear to the first housing, the second housing, the ambient air, or a combination thereof in block 604.

The skilled artisan will recognize that main rotor gearbox 114, including ring gear 428 and method 600, provide effective systems and methods for cooling ring gear 428, and that such systems and methods are useful in providing cooling during a loss of lubrication event.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A ring gear comprising:
a ring having one or more sets of inwardly facing teeth;
wherein the ring comprises a circumferential flange extending outward from the ring; and
wherein the flange is mounted between a first housing and a second housing, and the flange protrudes outside the first housing and second housing and into an ambient air.

2. The ring gear of claim 1, wherein the flange is disposed proximate to an upper portion, middle portion or lower portion of the ring.

3. The ring gear of claim 1, wherein the inwardly facing teeth are straight, helical or curved.

4. The ring gear of claim 1, wherein the ring gear is cooled by conduction of heat away from the ring gear through the first housing or the second housing or a combination thereof.

5. The ring gear of claim 1, wherein the ring gear is cooled by convection of heat away from the ring gear to the ambient air outside the ring gear.

6. The ring gear of claim 1, further comprising at least one mounting hole disposed in and through the flange.

7. A gearbox, comprising:
a first housing;
a second housing; and
a ring gear comprising a ring having one or more sets of inwardly facing teeth, a circumferential flange extending outward from the ring, and wherein the flange is mounted between the first housing and the second housing, and the flange protrudes outside the first housing and second housing and into an ambient air.

8. The gearbox of claim 7, wherein the flange is disposed proximate to an upper portion, middle portion or lower portion of the ring.

9. The gearbox of claim 7, wherein the inwardly facing teeth are straight, helical or curved.

10. The gearbox of claim 7, wherein the ring gear is cooled by conduction of heat away from the ring gear through the first housing or the second housing or a combination thereof.

11. The gearbox of claim 7, wherein the ring gear is cooled by convection of heat away from the ring gear to the ambient air outside the ring gear.

12. The gearbox of claim 7, further comprising at least one mounting hole disposed in and through the flange.

13. The gearbox of claim 7, wherein the gearbox is a main rotor gearbox.

14. The gearbox of claim 7, further comprising:
a planetary carrier supporting a plurality of planet pinion gears that rotate within and engage the one or more sets of inwardly facing teeth of the ring gear;
a planetary sun gear disposed between and engaging the plurality of planet pinion gears; and
a first bull gear connected to the planetary sun gear.

15. The gearbox of claim 14, further comprising:
two or more pinion gears that engage the first bull gear; and
a second bull gear connected to each pinion gear.

16. The gearbox of claim 15, further comprising two drive inputs wherein each drive input connected to one of the second bull gears.

17. A method of cooling a ring gear, comprising:
providing a gearbox having a first housing, a second housing, and a ring gear comprising a ring having one or more sets of inwardly facing teeth, a circumferential flange extending outward from the ring, and wherein the flange is mounted between the first housing and the second housing, and the flange protrudes outside the first housing and second housing and into an ambient air; and
transferring a heat from the ring gear to the first housing, the second housing, the ambient air, or a combination thereof.

18. The method of claim 17, wherein the flange is disposed proximate to an upper portion, middle portion or lower portion of the ring.

19. The method of claim 17, wherein the inwardly facing teeth are straight, helical or curved.

20. The method of claim 15, wherein the gearbox is a main rotor gearbox.

21. A rotorcraft, comprising:
a fuselage;
one or more engines disposed within the fuselage;
a main rotor gearbox disposed within the fuselage comprising:
a first housing,
a second housing, and
a ring gear comprising a ring having one or more sets of inwardly facing teeth, a circumferential flange extending outward from the ring, a plurality of mounting holes disposed in and through the flange, and wherein the flange is mounted between and in contact with the first housing and the second housing, and the flange protrudes outside the first housing and second housing and into an ambient air,
a planetary carrier supporting a plurality of planet pinion gears that rotate within and engage the one or more sets of inwardly facing teeth of the ring gear,
a planetary sun gear disposed between and engaging the plurality of planet pinion gears,
a first bull gear connected to the planetary sun gear,
one or more pinion gears that engage the first bull gear, and
a second bull gear connected to each pinion gear and coupled to each engine; and
a mast engaging the planetary carrier.

22. The rotorcraft of claim 21, wherein the flange is disposed proximate to an upper portion, middle portion or lower portion of the ring.

23. The rotorcraft of claim 21, wherein the inwardly facing teeth are straight, helical or curved.

24. The rotorcraft of claim 21, wherein the ring gear is cooled by conduction of heat away from the ring gear through the first housing or the second housing or a combination thereof.

25. The rotorcraft of claim 21, wherein the ring gear is cooled by convection of heat away from the ring gear to the ambient air outside the ring gear.

26. The rotorcraft of claim 21, further comprising at least one mounting hole disposed in and through the flange.

* * * * *